United States Patent [19]
Ansell et al.

[11] Patent Number: 5,420,760
[45] Date of Patent: May 30, 1995

[54] MICROCOMPUTER ENCLOSURE WITH INTERRUPTED WEDGE LOCKING ARRANGEMENT AND SHIELDING LINER

[75] Inventors: Daniel F. Ansell, Coral Springs; Jeffrey W. Benck, Delray Beach; James C. Harris, Boca Raton, all of Fla.; Steven E. Howell, Lexington, Ky.; Brian A. Trumbo, Boynton Beach; Robert D. Wysong, Boca Raton, both of Fla.

[73] Assignee: International Business Machines Corp., Armonk, N.Y.

[21] Appl. No.: 241,379

[22] Filed: May 11, 1994

Related U.S. Application Data

[63] Continuation of Ser. No. 543,441, Jun. 28, 1990, abandoned.

[51] Int. Cl.⁶ .............................................. H05K 9/00
[52] U.S. Cl. .................................. 361/818; 174/35 R; 174/35 GC; 361/752; 361/759; 361/730; 361/732
[58] Field of Search ................ 174/35 R, 35 GC; 220/297, 300; 361/752, 759, 730, 732, 816, 818; 312/301, 308, 293.1

[56] References Cited

U.S. PATENT DOCUMENTS

| | | | |
|---|---|---|---|
| 2,825,042 | 2/1958 | Tollefson et al. | 339/253 |
| 2,879,988 | 8/1957 | Klisch | 268/98 |
| 3,904,262 | 9/1975 | Cutchaw | 439/73 |
| 4,329,919 | 5/1982 | Andersen | 220/300 |
| 4,399,316 | 8/1983 | Woodward | 174/35 |
| 4,672,510 | 6/1987 | Castner | 361/752 |
| 4,688,148 | 8/1987 | Mallory et al. | 361/395 |
| 4,717,990 | 1/1988 | Tugcu | 174/35 R |
| 4,723,686 | 2/1988 | Pennisi | 220/300 |
| 4,759,466 | 6/1988 | Chase et al. | 220/306 |

FOREIGN PATENT DOCUMENTS

| | | | |
|---|---|---|---|
| 2043174 | 1/1992 | Canada | 361/818 |
| 0463776 | 1/1992 | European Pat. Off. | 361/818 |
| 0467521 | 1/1992 | European Pat. Off. | 361/818 |
| 2533400 | 3/1984 | France | 361/415 |
| 2-78296 | 3/1990 | Japan | 361/818 |
| 0083049 | 4/1935 | Sweden | 220/300 |
| 0694495 | 7/1953 | United Kingdom | 220/300 |

OTHER PUBLICATIONS

IBM Technical Disclosure Bulletin "Copper/Polyester Laminate as an EMI/ESD Shield" vol. 28 No. 10 Mar. 1986.
IBM Technical Disclosure Bulletin "Electrical Grounding Means for a Machine Enclosure" vol. 29 No. 9 Feb. 1987.
IBM Disclosure Bulletin "Electrical Ground Enclosure Improvementp" vol. 31 No. 1 Jun. 1988.
Research Disclosure "Total EMI Enclosure" No. 334 Feb. 1992.

*Primary Examiner*—Leo P. Picard
*Assistant Examiner*—Donald A. Sparks
*Attorney, Agent, or Firm*—Daniel E. McConnell

[57] ABSTRACT

This invention relates to enclosures for microcomputers, and more particularly to such an enclosure which facilitates access to and shielding of the operative components of a personal computer. The enclosure includes a chassis, a cover for cooperating with the chassis for enclosing a volume to contain operating components of the microcomputer, and interrupted wedge members for coupling the chassis and cover upon relative movement therebetween in a predetermined direction. The interrupted wedge members include a plurality of hooks on one of the chassis and cover and a plurality of pockets on the other, with the hooks and pockets being disposed along two sides of the chassis and cover for entry of hooks into cooperating pockets on movement of the cover into position for cooperation with the chassis in enclosing a volume.

13 Claims, 6 Drawing Sheets

MICROCOMPUTER ENCLOSURE WITH INTERRUPTED WEDGE LOCKING ARRANGEMENT AND SHIELDING LINER

RELATED APPLICATION

This application is a continuation of application Ser. No. 07/543,441 filed 28 Jun. 1990 and to be abandoned after filing of this application.

FIELD AND BACKGROUND OF INVENTION

This invention relates to enclosures for microcomputers, and more particularly to such an enclosure which facilitates access to and shielding of the operative components of a personal computer.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT microcomputers and IBM's PERSONAL SYSTEM/2 Models 25, 30, 50, 60, 70 and 80 microcomputers.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

Personal computer systems have generally been provided with enclosures which accomplish multiple desired purposes, including providing a pleasing visual appearance, providing protective packaging to protect the components against damage otherwise possibly occurring, and providing shielding against emission of electromagnetic interference. Many such systems are designed in contemplation of user addition of accessory cards such as video display drivers, communications devices of various sorts, and the like. For that reason, the enclosures used with most personal computer systems are designed to permit relatively easy user access to components housed within the enclosure.

A contrasting design requirement is that the enclosures permit achievement of security for the housed components. That is, while access is desirable, it is also desirable to control such access to guard against unauthorized modification of a system. The design resolution of these and other competing requirements has been the general adoption of fabricated metal enclosures with provision of various means for sliding covers from chassis components.

The use of sliding covers, while successfully meeting the competing design requirements, has presented some difficulties in use. One is that access to the components housed within the enclosure typically requires the entire removal of the cover, and such removal typically requires a relatively great extent of movement of the cover from the chassis. Another is that many covers can deceptively appear to be secured when that is not the case, leading to damage to the computer by dropping when an effort is made to lift the computer by the enclosure.

BRIEF DESCRIPTION OF INVENTION

With the foregoing discussion particularly in mind, it is an object of this invention to facilitate user access to components of a personal computer housed within an enclosure for the computer. In realizing this object of the invention, a locking arrangement for a cover and chassis is contemplated in which a secure locking together of the cover and chassis is accomplished by a set of cooperating hooks and pockets which enable locking and unlocking with relatively short distance movement.

Yet a further object of this invention is to enhance the shielding provided by an enclosure against emission of electromagnetic interference. In realizing this object of the present invention, a set of cooperating hooks and pockets which enable locking and unlocking of a cover and chassis are constructed as an interrupted wedge, so that movement toward a locked position causes a force which draws the cover and chassis into intimate contact one with another.

Yet another object of this invention is to provide enhanced control over the outward appearance of a personal computer enclosure. In realizing this object of the present invention, an enclosure cover is formed in two parts—a molded decorative outer portion and a shielding liner which is secured in place within the cover.

Still yet another object of this invention is to provide a microcomputer which comprises a chassis, a cover for cooperating with the chassis for enclosing a volume to contain operating components of the microcomputer, and interrupted wedge members for coupling the chassis and cover upon relative movement therebetween in a predetermined direction, the interrupted wedge members comprising a plurality of hooks on one of the chassis and cover and a plurality of pockets on the other of the chassis and cover, the hooks and pockets being disposed along two sides of the chassis and cover for entry of the hooks into the pockets on movement of the cover in the predetermined direction and into position for cooperation with the chassis in enclosing a volume, each of the hooks having a surface thereof disposed to define a sloping wedge surface, each of the surfaces extending at a predetermined acute angle to the predetermined direction and parallel to the surfaces defined by other hooks along the same side of the one of the chassis and cover, and the pockets receiving the hooks and cooperating with the sloping wedge surfaces upon movement between the chassis and cover in the predetermined direction for drawing the chassis and cover into intimate contact one with the other.

BRIEF DESCRIPTION OF DRAWINGS

Some of the objects of the invention having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
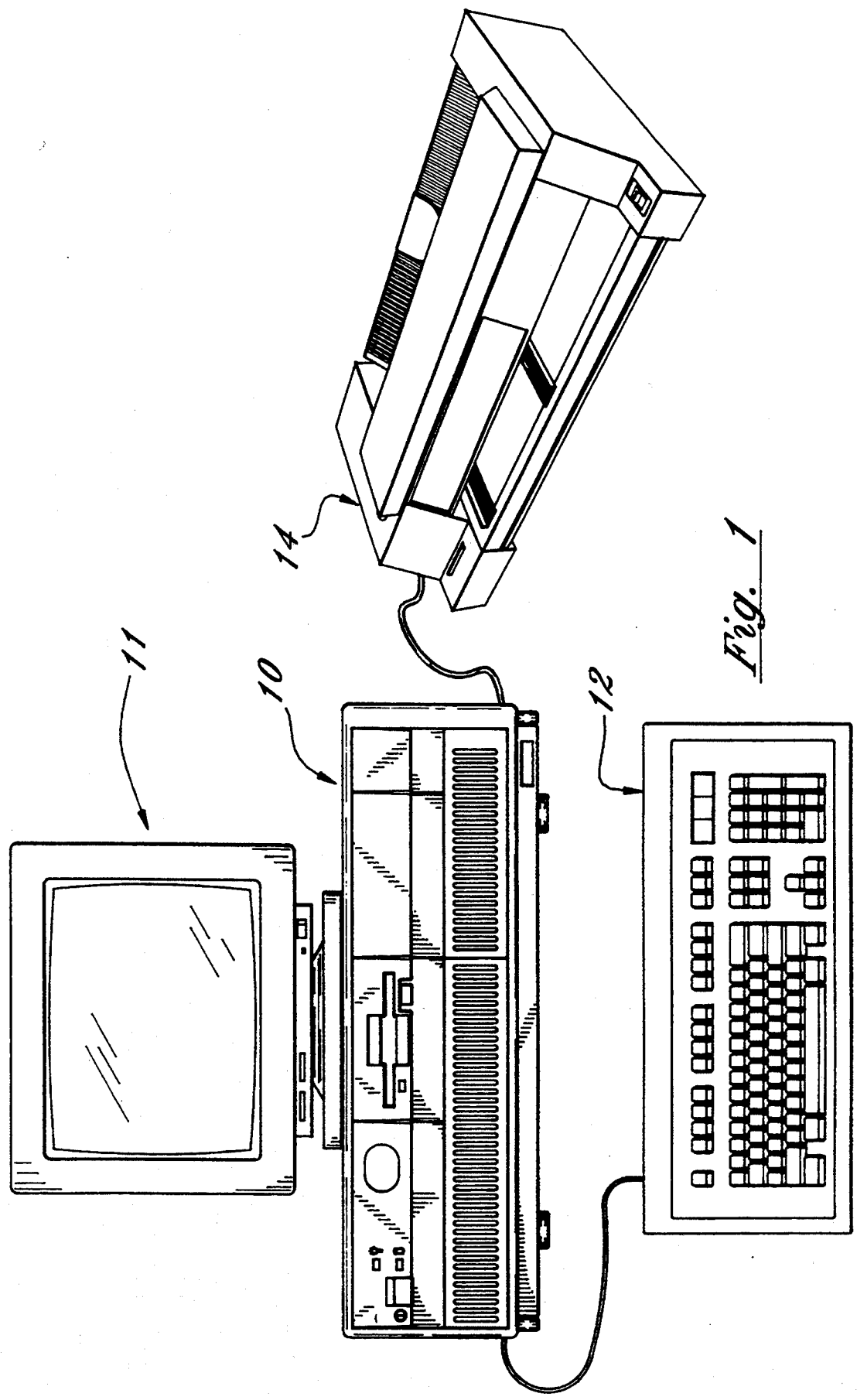
FIG. 1 is a perspective view of a personal computer embodying this invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a planar board 20 which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
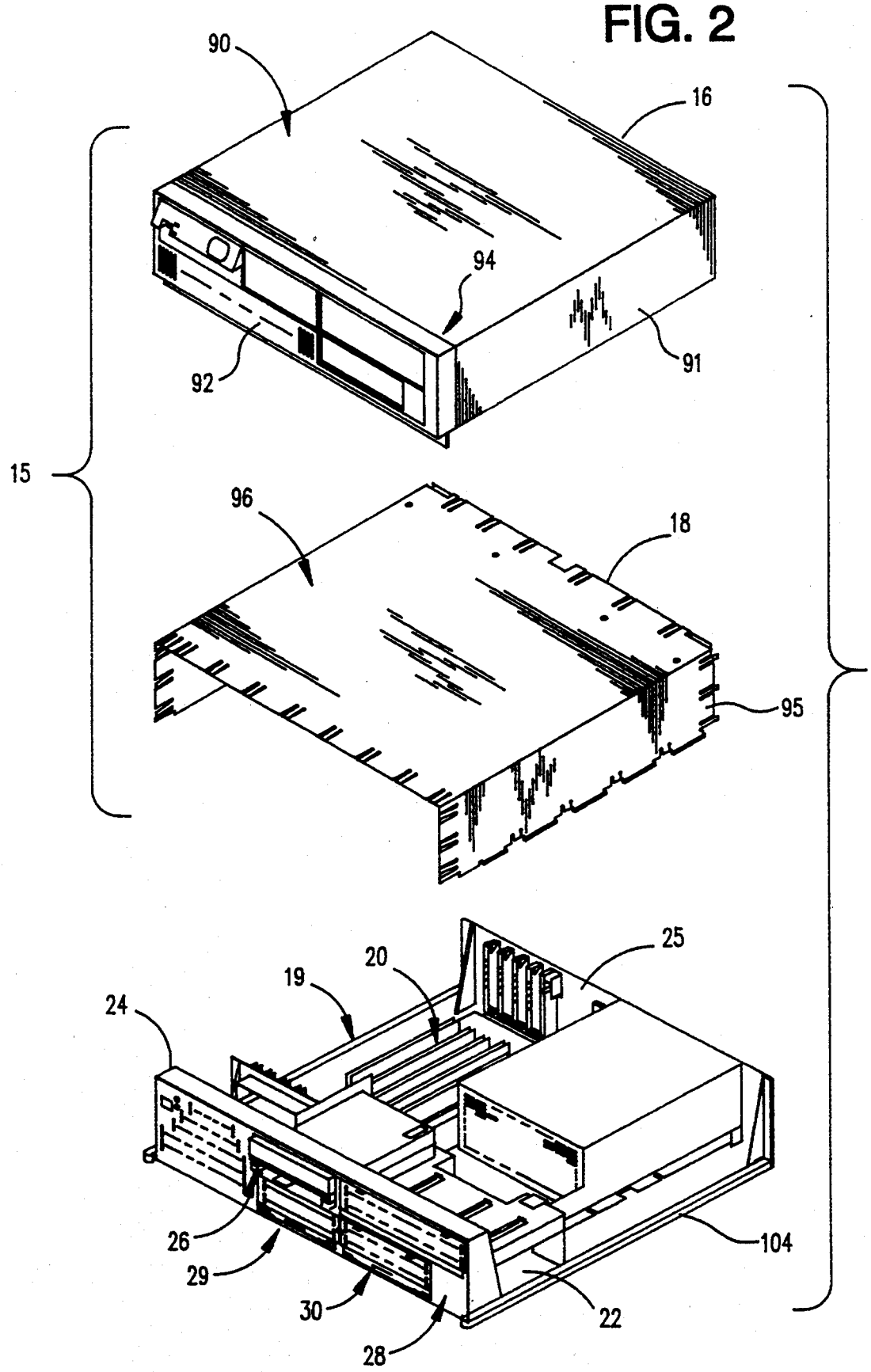
FIG. 2 is an exploded perspective view of certain elements of the personal computer of FIG. 1 including a chassis, a cover, an electromechanical direct access storage device and a planar board and illustrating certain relationships among those elements.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch).

Figure 3A:
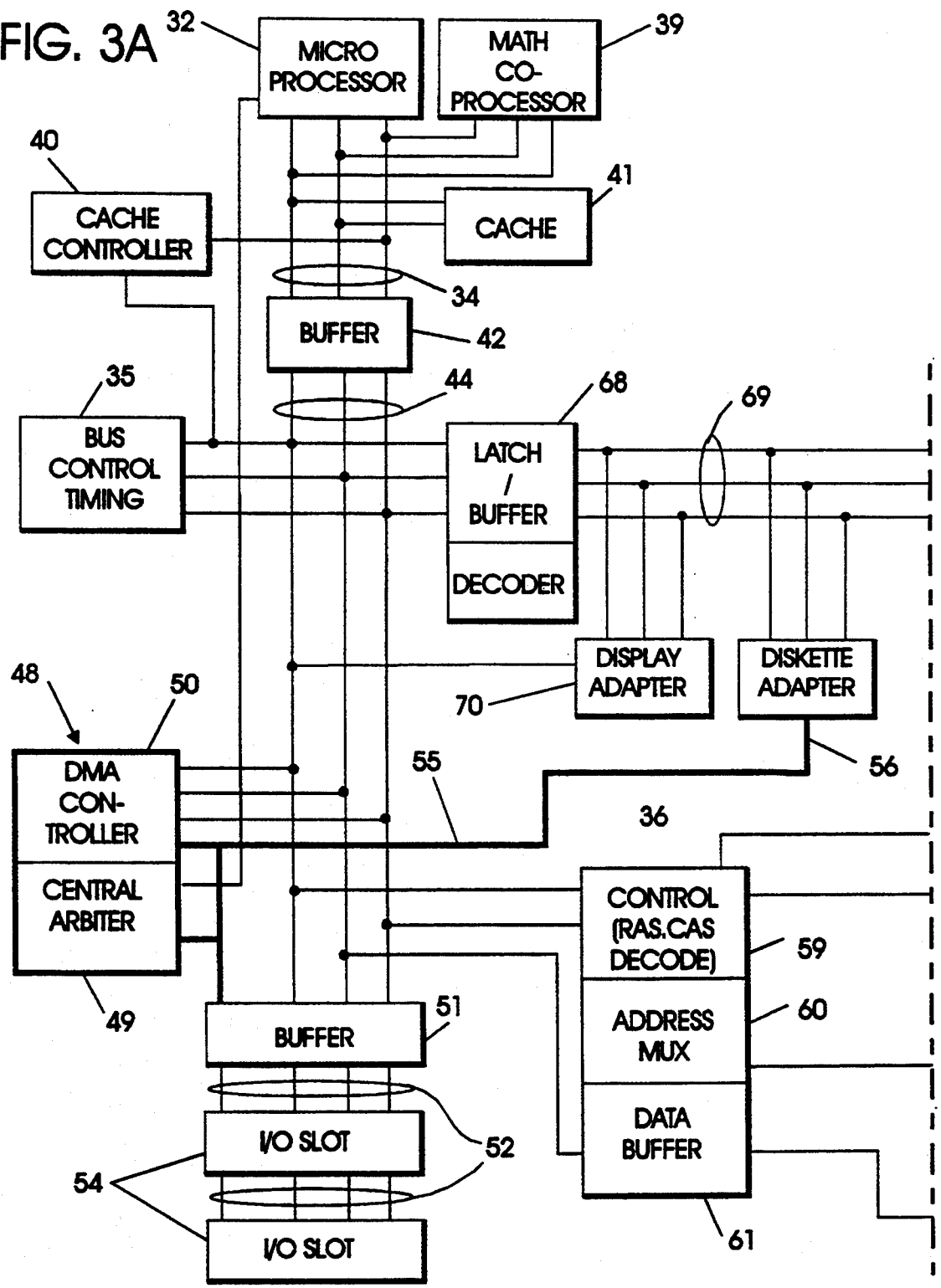
FIG. 3, comprised of FIGS. 3A and 3B, is a schematic view of certain prior art components of the personal computer of FIGS. 1 and 2.
Figures 3, 3B:
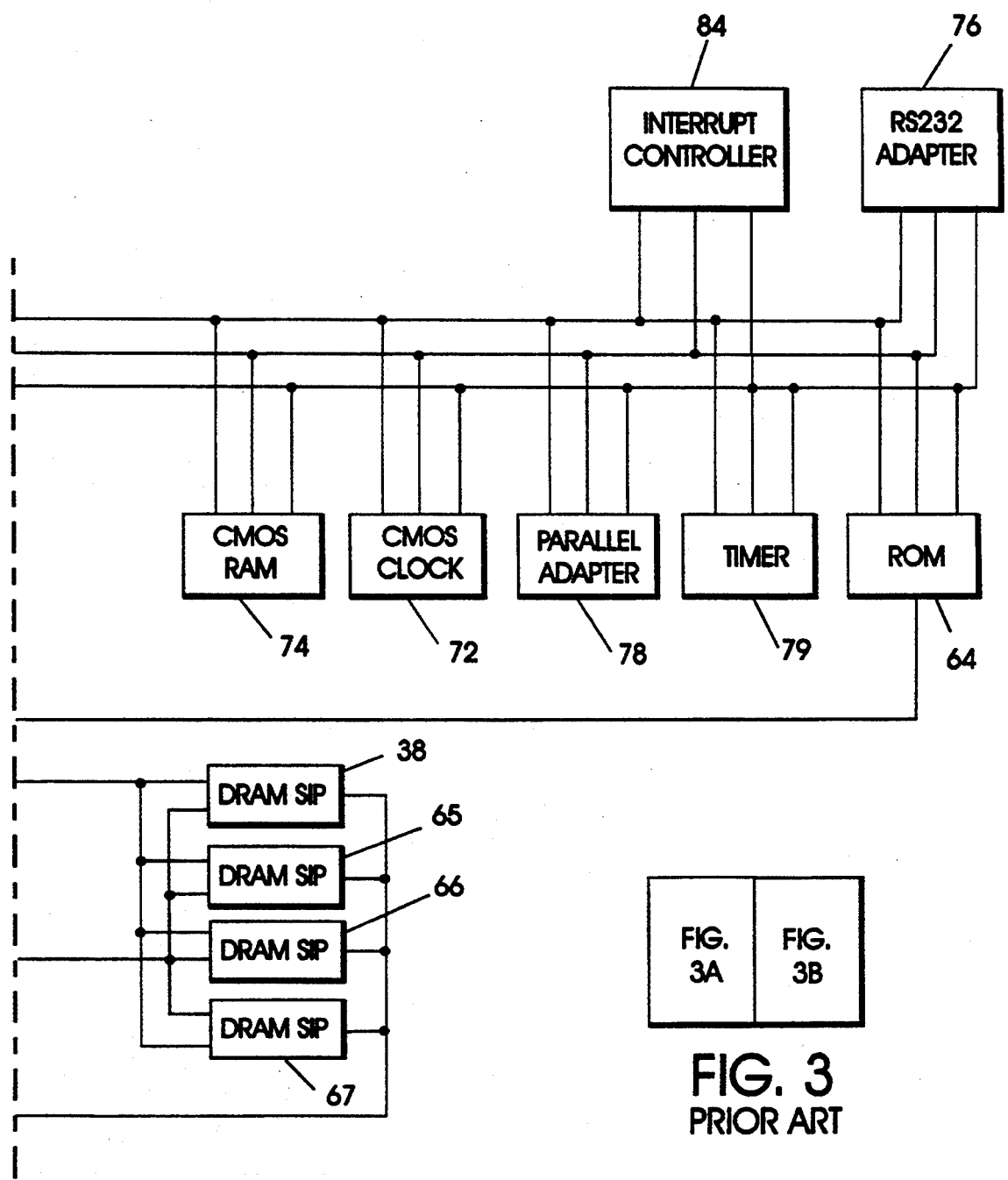

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar board is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 24 is a buffer 42. The buffer 42 is itself connected to a slower speed (compared to the CPU local bus) system bus 44, also comprising address, data and control components. The system bus 44 extends between the buffer 42 and a further buffer 51. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the MICRO CHANNEL bus 52. Connected to the bus 52 are a plurality of I/O slots 54 for receiving MICRO CHANNEL adapter cards which may be further connected to an I/O device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic 1 megabyte RAM module, it is understood that additional memory can be interconnected as represented in FIG. 3 by the optional memory modules 65 through 67. For purposes of illustration only, the present invention is described with reference to the basic one megabyte memory module 38.

A further buffer 68 is coupled between the system bus 44 and a planar I/O bus 69. The planar I/O bus 69 includes address, data, and control components respectively. Coupled along the planar bus 69 are a variety of I/O adapters and other components such as the display adapter 70 (which is used to drive the monitor 11), a clock 72, nonvolatile RAM 74 herein after referred to as NVRAM, a RS232 adapter 76, a parallel adapter 78, a plurality of timers 80, a diskette adapter 56, an interrupt controller 84, and a read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

The cover 15, in accordance with this invention, cooperates with the chassis 19 for enclosing a volume to contain the planar board 20 and the operative components connected thereby. The cover comprises a unitary decorative cover 16 molded of a moldable synthetic material for defining a decorative outer surface for at least three sides of the cover, and an electrically conductive, metallic sheet liner 18 formed to nest within the decorative cover 16 for cooperating with the chassis 19 in defining a shielded volume and for thereby controlling the emission of electromagnetic interference from the operative components of the microcomputer. The planar board 20 preferably has characteristics which cooperate with the chassis and cover as here described in controlling emissions, and follows the teachings of U.S. patent application Ser. No. 07/556,924, filed 20 Jul. 1990, abandoned in view of Ser. No. 08/185,723, now U.S. Pat. No. 5,353,202.

The cover 15, when made and used with the liner 18 as contemplated by this invention, achieves a number of desirable results. The cover is a molded, one piece assembly providing a relatively large, flat area 90 as a planar surface for the enclosed computer; sidewalls 91 extending perpendicular to the planar surface, and an appearance panel portion defining a front surface 92 extending perpendicular to the sidewalls and the planar surface. As a one piece component, full control is exercised over appearance factors such as a groove 94 which visually separates the front surface portion from the planar surface portion, while also providing complete control over uniformity of coloration and texture if desired. The cost of assembling two components is avoided, which has heretofore been encountered where separate front panels have been used. Finally, the one piece component has greater strength against loads possibly imposed on the large planar area (such as the weight of a monitor when the computer is used as a desk top unit and as illustrated in FIG. 1). The appearance panel portion reinforces the major surface area portion against forces imposed perpendicular to that major area, and functions to conceal the chassis 19 from view when the chassis and cover 15 are coupled.

Figure 6:
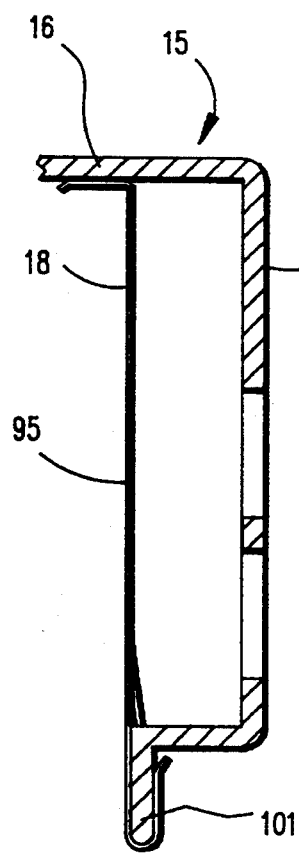
FIG. 6 is a vertical section view, partly broken away, showing portions of the interlocking structure of the personal computer of FIGS. 2, 4 and 5.

In the illustrated embodiment (FIG. 2), the strength of the one piece cover is reinforced by the electromagnetic interference or compatibility shield liner 18. The liner 18 has a relatively large, flat area 96 defining a planar surface which nests within the cover 16 and sidewalls 95 extending perpendicular to the planar surface. Preferably the liner 18 is secured to the cover by engagement of small openings formed in the liner with projections or protrusions formed on the cover, and by engagement of U shaped bent legs of the liner with cover hook portions described more fully hereinafter (FIG. 6). The liner defines eight edges (seven of which are visible in FIG. 2) and is drawn into intimate, electrically conductive, engagement with the chassis 19 along each of those edges when the enclosure is assembled, thereby assuring that emissions otherwise possibly leading to electromagnetic interference are suppressed. Preferably, and as shown, the liner is provided with a number of flexible fingers or tongues around the eight edges for assuring that such contact with the chassis is established and maintained. Being metallic, the liner 18 also provides strengthened attachment points for assembly screws and the like and for engagement by an enclosure lock (not visible in the Figures) mounted to extend through the rear panel 25. The lock, when engaged, prevents movement of the cover forwardly in FIG. 4 as if for removal.

Figure 7:
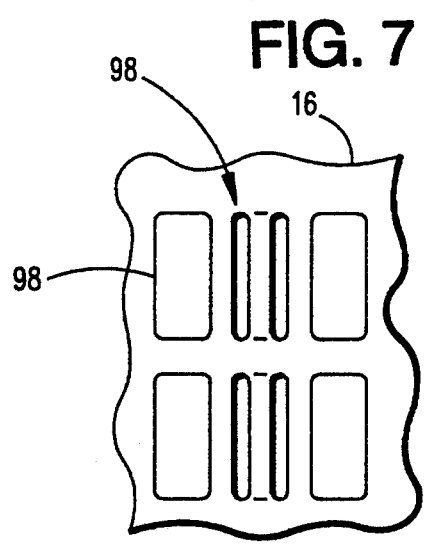
FIG. 7 is a partial elevation view illustrating the relationship between openings into a plenum chamber for cooling air provided by the structure of FIG. 6.

In the form illustrated, the cover 16 and liner 18 cooperate further in providing a plenum for controlling the distribution of cooling air entering the enclosure. More particularly, air for cooling components of the computer housed within the enclosure enters from one side (the left side viewed from the front of the computer). On that side, the sidewall of the liner 18 is spaced from and within the sidewall of the cover 16, and each is provided with a pattern of louver openings 98, 99 (FIGS. 6 and 7). The openings provided in the two sidewalls are staggered and non-aligned, and preferably have differing open areas (FIG. 7). As will be appreciated, controlling the size and placement of the openings enables controlling the distribution of the volume of air drawn through the openings for cooling of computer components housed within the enclosure. The louver openings 98 in the cover 16 may be designed with the aesthetics of appearance as a major factor, while thermal load distribution factors may play a major part in the design of the openings 99 in the liner 18.

Figure 4:
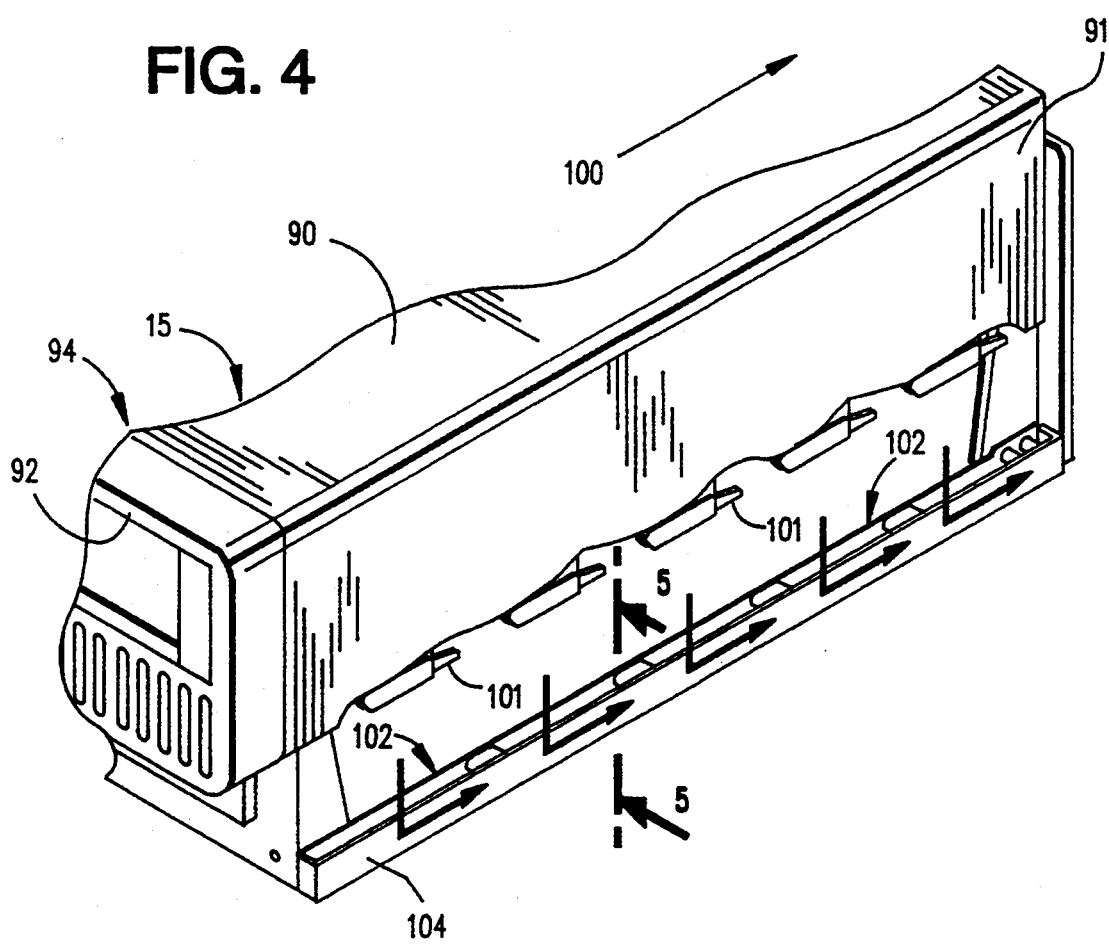
FIG. 4 is a partial perspective view showing certain elements of the personal computer of FIGS. 1 and 2 which cooperate in securing together a cover and chassis in accordance with this invention.
Figure 5:
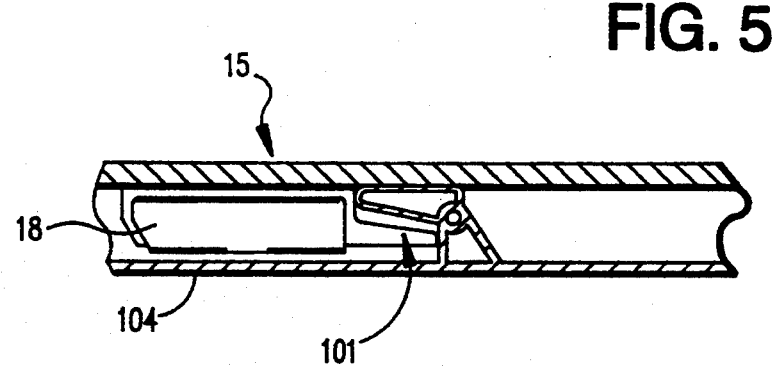
FIG. 5 is a vertical section view through portions of the personal computer of FIGS. 2 and 4.

In order to accomplish certain objectives of this invention, the cover and chassis are joined together by interrupted wedge members for coupling the chassis and the cover upon relative movement therebetween in a predetermined direction (indicated at 100 in FIG. 4). More particularly, the interrupted wedge members comprise a plurality of hooks 101 on one of the chassis and cover and a plurality of pockets 102 on the other of the chassis and cover, with the hooks and pockets being disposed along two sides of the chassis and cover for entry of the hooks into the pockets on movement of the cover in the predetermined direction and into position for cooperation with the chassis in enclosing a volume. Each of the hooks has a surface thereof disposed to define a sloping wedge surface, with each of the surfaces extending at a predetermined acute angle to the predetermined direction and parallel to the surfaces defined by other hooks along the same side of the element on which the hooks are located. It is this characteristic of the hooks which leads to the characterization of the locking arrangement of this invention as being an "interrupted wedge". What is intended to be conveyed by that characterization is that the sloping surfaces of the hooks are formed as if a long tapering wedge surface had been cut into short lengths, and those lengths then moved into alignment along an edge of the element bearing them.

In the form here shown and to which this description refers, the hooks 101 are formed in the cover 15. However, as the description proceeds, a reader of ordinary skill in the relevant art will discern that the placement of the hooks and pockets may be reversed (or otherwise varied including dispersal of alternate hooks and pockets along a common side of the chassis and cover) while still achieving the desirable results of this invention.

The pockets 102 are formed, in the illustrated embodiment, in trim strips 104 which are secured along side edges of the chassis 19. Regardless of how and where the hooks and pockets may be formed, the pockets 102 receive the hooks 101 and cooperate with the sloping wedge surfaces 105 upon movement between the chassis and the cover in the predetermined direction for drawing the chassis and cover into intimate contact one with the other. In drawing the cover and chassis together in this manner, the electrically conductive liner 18 and chassis 19 are brought into electrical contact one with another in order to complete the emission shield mentioned above.

Preferably, the dimensions of the hooks and pockets relative to the remainder of the enclosure are such that they cooperate for locking and unlocking the cover and chassis one from the other upon relative movement therebetween over a distance less than one tenth the dimension of the cover 15 in the direction of the predetermined direction 100.

In the drawings and specifications there has been set forth a preferred embodiment of the invention and, although specific terms are used, the description thus given uses terminology in a generic and descriptive sense only and not for purposes of limitation.

What is claimed is:

1. A microcomputer enclosure comprising:
   a chassis comprised of an electrically conductive material;
   a cover for enclosing with said chassis a volume to contain operating components of a microcomputer, said cover comprising a unitary decorative shell molded of a moldable synthetic material for defining a decorative outer surface for at least three sides of said cover, and an electrically conductive, metallic sheet liner formed to nest within said decorative cover for cooperating with said chassis in defining a shielded volume; and
   a plurality of interrupted wedge members for coupling said chassis and said cover upon linear relative movement therebetween in a predetermined direction, said interrupted wedge members being formed as a plurality of hooks on one of said chassis and said cover, and a plurality of pockets on the other of said chassis and said cover,
   said hooks and said pockets being disposed along two sides of said chassis and said cover for entry of said hooks into said pockets on movement of said cover in said predetermined direction and into position for enclosing a volume with said chassis, each of said hooks having a surface thereof disposed to define a sloping wedge surface, each of said surfaces extending at a predetermined acute angle to said predetermined direction and parallel to the surfaces defined by other hooks along the same side of said one of said chassis and said cover, and said pockets receiving said hooks and cooperating with said sloping wedge surfaces upon movement between said chassis and said cover in said predetermined direction for drawing said chassis and said liner into intimate contact one with the other and establishing an electrically conductive connection therebetween for facilitating the formation by said chassis and said liner of a shield against emission of electromagnetic interference from operating components of the computer housed within the enclosure thus formed.

2. A microcomputer according to claim 1 wherein said hooks and said pockets cooperate for locking and unlocking said cover and said chassis one from the other upon relative movement therebetween over a distance less than one tenth the dimension of said cover in the direction of said predetermined direction.

3. A microcomputer according to claim 1 wherein said hooks are carried on said cover and said pockets are carried on said chassis.

4. A microcomputer according to claim 3 further comprising a pair of trim strips mounted on opposite sides of said chassis and further wherein said trim strips define said pockets.

5. A microcomputer according to claim 1 further comprising a planar board mounted on said chassis and a plurality of operative components operatively connected with said planar board for together functioning as a personal computer, said chassis and said cover together defining an enclosure extending about said planar board and said operative components.

6. A microcomputer comprising:
   a chassis formed of an electrically conductive material;
   a planar board mounted on said chassis;
   a plurality of operative components operatively connected with said planar board for together functioning as a personal computer; and
   a cover for enclosing with said chassis a volume to contain said planar board and said operative components, said cover comprising:
   a unitary decorative shell molded of a moldable synthetic material for defining a decorative outer surface for at least three sides of said cover,
   an electrically conductive, metallic sheet liner formed to nest within said decorative shell for defining with said chassis a shielded volume, and a plurality of hooks on one of said chassis and said cover and a plurality of pockets on the other of said chassis and said cover for coupling said chassis and said cover upon linear relative movement therebetween in a predetermined direction, said hooks and said pockets cooperating upon movement between said chassis and said cover in said predetermined direction for drawing said chassis and said liner into intimate, electrically conductive contact one with the other and establishing an electrically conductive connection therebetween for facilitating the formation by said chassis and said liner of a shield against emission of electromagnetic interference from said operating components housed within the enclosure thus formed.

7. A microcomputer according to claim 6 wherein said decorative cover means defines a major surface area portion, sidewall portions perpendicular to said major portion and connected therewith along opposite side edges thereof, and an appearance panel portion perpendicular to said major portion and said sidewall portions.

8. A microcomputer according to claim 7 wherein said appearance panel portion reinforces said major portion against forces imposed perpendicular to said major area.

9. A microcomputer according to claim 7 wherein said appearance panel portion conceals said chassis from view when said chassis and said cover are coupled.

10. A microcomputer according to claim 7 wherein said liner means reinforces said major portion against forces imposed perpendicular to said major area.

11. A microcomputer according to claim 7 wherein said liner means defines a major surface area portion and sidewall portions perpendicular to said major portion and connected therewith along opposite side edges thereof.

12. A microcomputer according to claim 11 wherein said liner means sidewall portions, along an edge of said liner means sidewall portions remote from said liner means major area portion, are wrapped about said decorative cover means sidewall portions, along an edge of said decorative cover means sidewall portions remote from said decorative cover means major area portion.

13. A personal computer system having a high speed system processor compatible with application programs and operating system software designed to execute on slower speed system processors, said personal computer system comprising:

a chassis formed of an electrically conductive material;

a planar board mounted on said chassis;

a high speed microprocessor mounted on said planar board and having a real and protected mode of operation coupled to a high speed data bus;

non-volatile memory electrically coupled to a slower speed data bus;

a bus controller for providing communications between the high speed data bus and the slower speed data bus;

volatile memory electrically responsive to the high speed data bus;

a memory controller electrically coupled to said volatile memory and said non-volatile memory, said memory controller regulating communications between said volatile memory and said high speed microprocessor;

a cover for cooperating with said chassis for enclosing a volume to contain said planar board and said microprocessor, said memory, and said controllers and comprising a unitary decorative shell molded of a moldable synthetic material for defining a decorative outer surface for at least three sides of said cover, and an electrically conductive, metallic sheet liner formed to nest within said decorative shell for cooperating with said chassis in defining a shielded volume, and a plurality of hooks on one of said chassis and said cover and a plurality of pockets on the other of said chassis and said cover for coupling said chassis and said cover upon relative movement therebetween in a predetermined direction, said hooks and said pockets cooperating upon movement between said chassis and said cover in said predetermined direction for drawing said chassis and said liner into intimate, electrically conductive contact one with the other and forming of said chassis and said liner a shield against emission of electromagnetic radiation otherwise possible emitted from said microprocessor, said memory and said controllers.

* * * * *